US007300096B2

(12) United States Patent
Maguire

(10) Patent No.: US 7,300,096 B2
(45) Date of Patent: Nov. 27, 2007

(54) EMERGENCY VEHICLE BLIND APPARATUS

(76) Inventor: Glenn A. Maguire, 388 Ultimo Ave., Long Beach, CA (US) 90814

( * ) Notice: Subject to any disclaimer, the term of this patent is extended or adjusted under 35 U.S.C. 154(b) by 197 days.

(21) Appl. No.: 11/098,258

(22) Filed: Apr. 4, 2005

(65) Prior Publication Data
US 2006/0220413 A1 Oct. 5, 2006

(51) Int. Cl.
B60J 11/02 (2006.01)

(52) U.S. Cl. .............................. 296/136.12; 296/136.1; 296/143

(58) Field of Classification Search ................ 296/141, 296/143, 136.1, 136.12, 136.04; 135/903; 40/591
See application file for complete search history.

(56) References Cited

U.S. PATENT DOCUMENTS

| 193,573 | A | | 7/1877 | Tripp | |
| 376,436 | A | | 1/1888 | Harrison | |
| 512,273 | A | * | 1/1894 | Brown | 296/163 |
| 727,817 | A | * | 5/1903 | MacDonald | 296/143 |
| 1,451,660 | A | * | 4/1923 | Hyland | 296/143 |
| 1,471,279 | A | * | 10/1923 | Raggis | 135/88.08 |
| 1,472,651 | A | * | 10/1923 | Holling | 296/138 |
| 1,523,350 | A | * | 1/1925 | Raggis | 135/88.08 |
| 3,563,594 | A | * | 2/1971 | London | 293/128 |
| 3,923,336 | A | * | 12/1975 | Price, Sr. | 296/161 |
| 4,124,196 | A | | 11/1978 | Hipskind | |
| 4,186,912 | A | | 2/1980 | Byrd, Jr. | |
| 4,971,384 | A | * | 11/1990 | Baldwin | 296/98 |
| 5,088,788 | A | * | 2/1992 | Moulton | 296/136.04 |
| 5,269,623 | A | | 12/1993 | Hanson | |
| 6,036,249 | A | | 3/2000 | Kuntz | |
| 6,142,701 | A | | 11/2000 | Falcon | |
| 6,733,204 | B1 | | 5/2004 | Paniccia | |
| 7,040,372 | B2 | * | 5/2006 | Johansson et al. | 160/24 |
| 2004/0135393 | A1 | * | 7/2004 | Neuer et al. | 296/136.1 |
| 2006/0249091 | A1 | * | 11/2006 | Orbach | 119/169 |

* cited by examiner

Primary Examiner—Dennis H. Pedder
Assistant Examiner—Mike Hernandez
(74) Attorney, Agent, or Firm—Fulwider Patton LLP

(57) ABSTRACT

A curtain mounted to the bottom, top, or one end of an emergency vehicle and deployable to cover the side of the vehicle in itself.

16 Claims, 3 Drawing Sheets

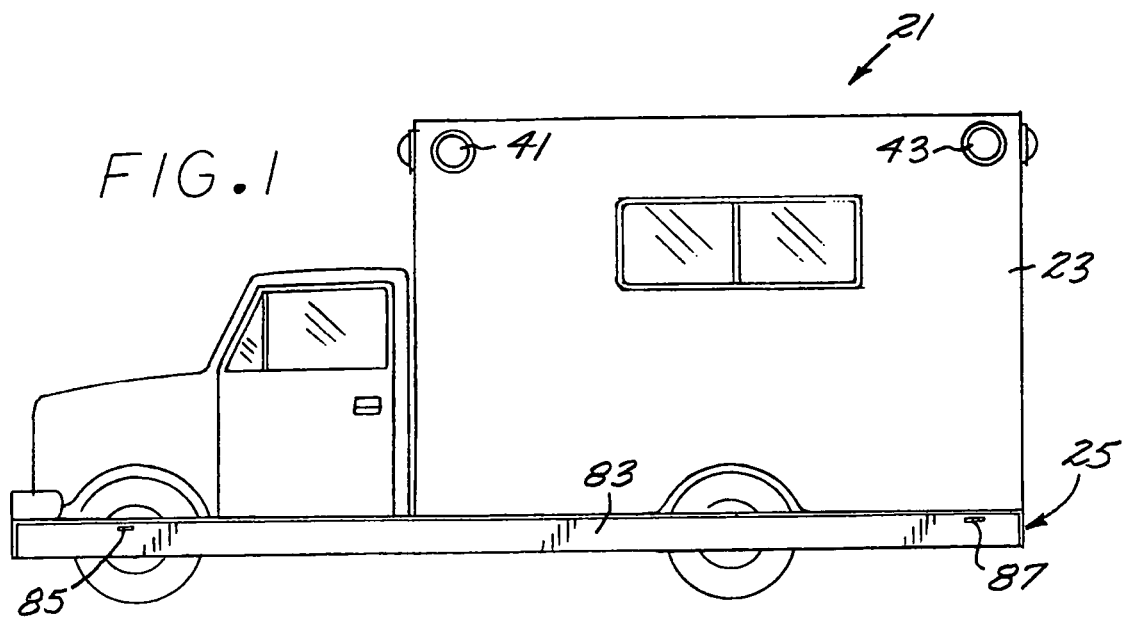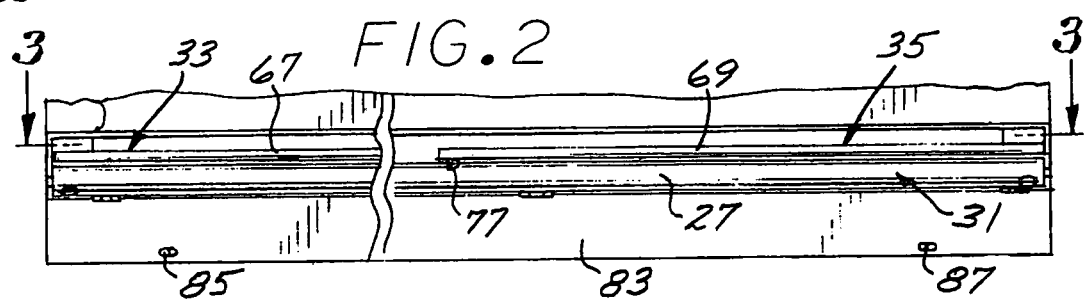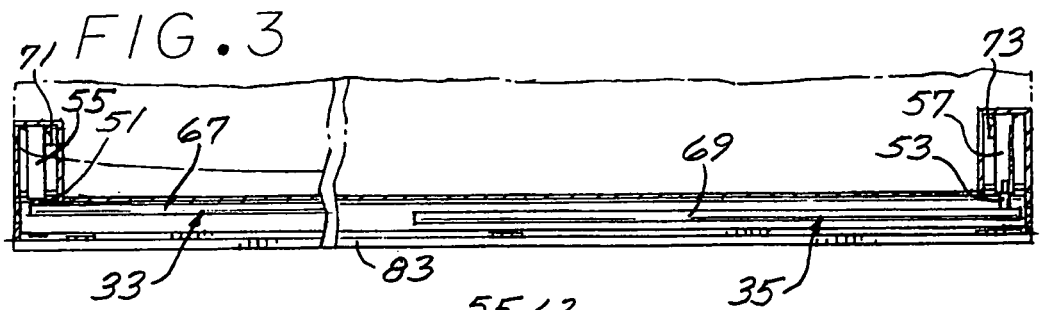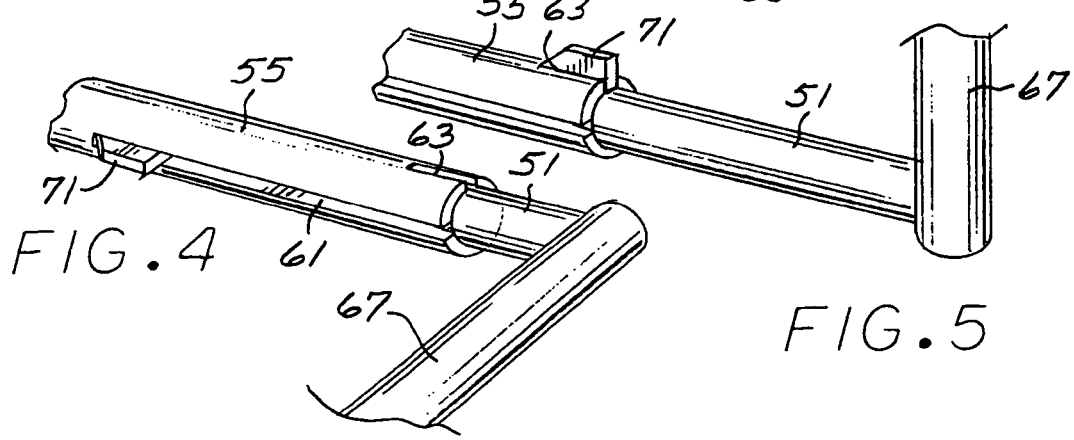

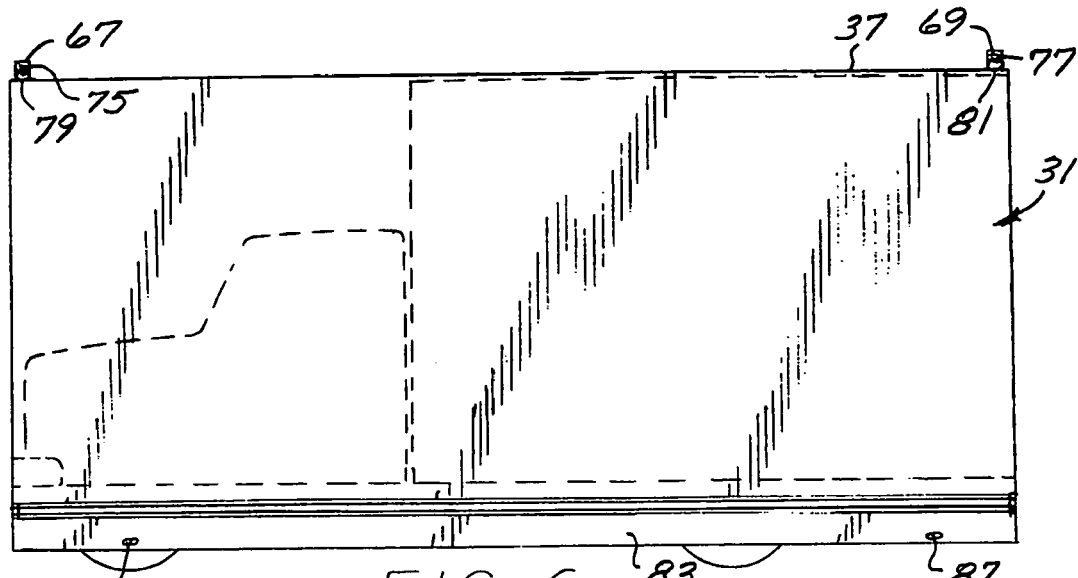
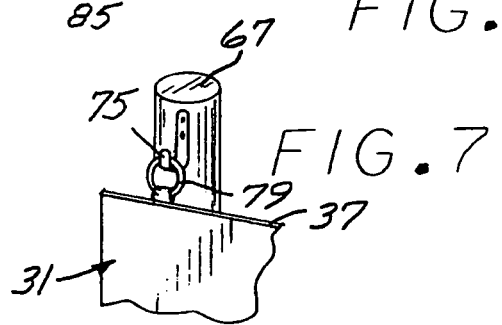
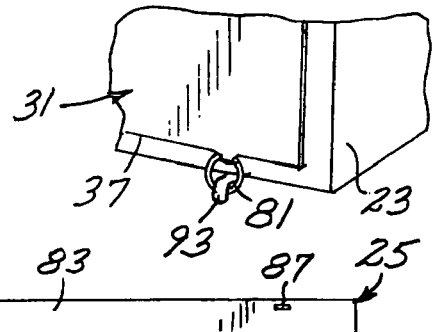
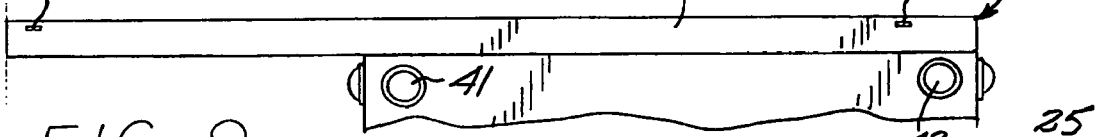
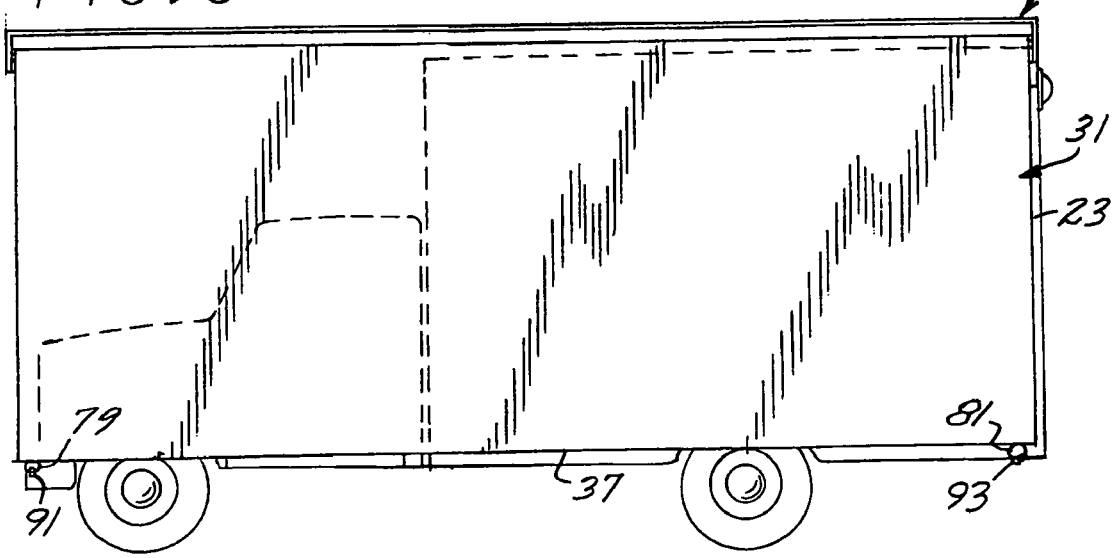

EMERGENCY VEHICLE BLIND APPARATUS

FIELD OF THE INVENTION

The present invention relates to screening devices employed to block view of motorists passing an accident or emergency scene such as to minimize viewing of an emergency vehicle and consequent slowing of the passers by.

BACKGROUND OF THE INVENTION

Description of the Prior Art

In recent years, as the roads, highways and freeways have become so crowded, particularly during rush hour that, traffic jams have become commonplace thus detracting from the orderly flow of traffic. Often times the arrival of an emergency vehicle at the scene of a traffic accident can distract passers by, both in the lane of traffic traveling in the direction of vehicles which may have been involved in accident or the like, and in the traffic traveling in the opposite direction. Drivers of vehicles passing the site attended by an emergency vehicle are often tempted to slow allowing them to view the distressed vehicle(s) and the paramedics or law enforcement personnel involved in the accident thereby resulting in the slowing of the flow of traffic in both directions, creating a domino effect, and resulting in the inefficient movement of traffic and a consequent additional consumption of fuel often times resulting in additional exhaust and pollutants being released to the atmosphere. More importantly, the slowing of traffic in the lanes adjacent an accident scene and/or distraction by driver's passing by often results in rear end accidents when a vehicle approaches a slowed vehicle at a greater velocity and, all too frequently, resulting in a high stressed driver swerving a vehicle from the lane of passing traffic toward the accident site thus endangering the life and limb of law enforcement and medical attendants whose duty necessitates them working in or about the traffic accident area.

As a result of the long known need to shield an accident scene from view by the passing traffic, many efforts have been made to provide a satisfactory blind which will be convenient to erect and deploy at the accident site. The device includes an elongated traffic screen deployable into an operative position by inflating tubular support conduits held erect by sand. A device of this patent is shown in U.S. Pat. No. 5,269,623 to Hanson. This device suffers the shortcoming that it typically involves time and effort in the inflating of the conduits and requires sand or some type of weighted material to support the device erect.

Another effort to provide a satisfactory blind involves the use of a number of plastic support posts intended to support a fabric screen by means of mounting cables. A device of this type is shown in U.S. Pat. No. 4,186,912 to Byrd, Jr. Devices of this type suffer the shortcoming that they typically require additional anchoring to near by objects and require significant time and effort to erect at the traffic site.

Another device proposed for solving the problem is a vertical reel which may be mounted to the bumper of a vehicle and is intended to deploy an elongated sheet of thin flexible material for support along its length on a plurality of individual stands or the like. A device of this type is shown in U.S. Pat. No. 4,124,196 to Hipskind. Such a device is cumbersome to set up and use, involves the use of numerous different components which between uses must be stored, accounted for and assembled and requires a vehicle or the like to be parked adjacent the accident scene for mounting of the device itself.

Other efforts have lead to a proposal that a plurality of foldable panels be stored in the trunk of an emergency vehicle and a inflatable screen be employed to facilitate erection of the foldable panels at the accident site. A device of this type is shown in U.S. Pat. No. 6,036,249 to Kuntz. Devices of this type are somewhat voluminous, requiring the use of car trunk space and again involve inflation at the accident site.

SUMMARY OF THE INVENTION

The emergency vehicle blind of the present invention is characterized by a curtain storage device mounted at the top, end or bottom side of an emergency vehicle, including a retractable reel operable to selectively deploy a curtain for covering the side and identifiable objects and outlines characteristic of the vehicle.

Other features and advantages of the invention will become apparent from the following detailed description, taken in conjunction with the accompanying drawings which illustrate, by way of example, the features of the invention.

BRIEF DESCRIPTION OF THE DRAWINGS

FIG. 1 is a side view of an emergency vehicle mounting a deployable blind embodying the present invention;

FIG. 2 is a side view similar to FIG. 1 but in enlarged scale with a retractable reel exposed;

FIG. 3 is a top view along the line 3-3 of FIG. 2;

FIG. 4 is a partial perspective view, in a enlarged scale, taken from one end of the curtain deployment device shown in FIG. 2;

FIG. 5 is a partial perspective view similar to FIG. 4 but showing the device prepared for erection;

FIG. 6 is a side view similar to FIG. 1 but showing the blind device erected;

FIG. 7 is a partial perspective view, in a enlarged scale, of the attachment of the curtain to a support device included in the device shown in FIG. 6;

FIG. 8 is a partial side view of a second embodiment of the emergency vehicle blind apparatus of the present invention;

FIG. 9 is a side view of an emergency vehicle employing the device of an apparatus of FIG. 8 but with the blind deployed; and FIG. 10 is a large partial perspective view of the apparatus shown in FIG. 9.

DETAILED DESCRIPTION OF THE INVENTION

Figure 11:
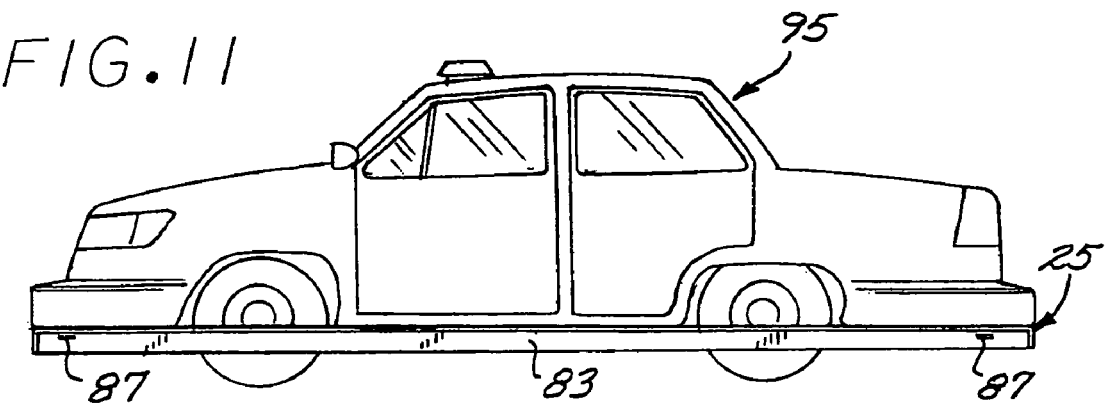
FIG. 11 is a side view of a sedan type emergency vehicle mounting a deployable blind of the present invention.

The emergency vehicle blind apparatus of the present invention includes, generally, an emergency vehicle 21 having a vertical sidewall 23 of a distinctive shape or characteristic and may include a retractor housing 25 which is openable to expose a retractor reel 27. In the preferred embodiment, a curtain, generally designated 31, is dispensed from the retractor reel 27 to be erected vertically over the vertical side 23 on one or more support devices, which may be in the form of post assemblies, generally designated 33 and 35, deployable to, for instance, an erect position as shown in FIGS. 6 and 7 for attachment thereto of the free end 37 of the curtain 31 to hold it in covering position over the side wall 23.

Emergency vehicles, such as paramedic vehicles 21 often times have a distinctive shape which may be readily spotted by curious motorists approaching an accident site or the like thus inducing the motorists to slow so the driver and or passengers might gain a view of the accident site and observe the work being undertaken by the emergency personnel.

With the congested highways, expressways and freeways forming the traffic network around metropolitan areas becoming more and more congested, the frequency of accidents or even malfunctioning or stalling of vehicles requiring emergency attention has risen significantly in recent years thus adding to the frequency of traffic jams caused by passing motorists "rubber necking" to view a traffic site. The danger to emergency personnel at an emergency site has increased significantly with increased traffic volume as, when traffic slows, there is often a tendency for drivers to involuntarily veer toward the emergency site or for the faster traffic overcoming slowed traffic to be forced out of lanes, often toward the emergency site resulting in endangerment and frequent bodily harm or even death to the emergency personnel. This danger has been of concern for many years to the public entities responsible for operating and overseeing emergency personnel, and the increased volume of claims made by injured personnel or their surviving family members has driven up the cost of insuring against potential claims made as a result of injuries or deaths at the emergency site. It is this problem that the present invention addresses.

For the purposes of illustration, the emergency vehicle 21 shown in FIG. 1 is depicted with a sidewall 23 having a rectangular shape truck panel and emergency lights 41 and 43 positioned at the top corners thereof and a forward cab. It will be appreciated that, in some instances, the emergency vehicle may have other shapes, such as the shape of a conventional sports utility vehicle or a conventional highway patrol sedan 95 (FIG. 11) with emergency lights mounted on the roof. In those instances, it will be appreciated by those skilled in the art, the curtain 31 will typically have sufficient length such that the post assemblies 33 and 35 will support the curtain raised above the level of the roof of the car and above the top surface of the emergency lights such that contour of those lights are likewise concealed from passing motorists.

As will be appreciated, the housing 25 is mounted from the sidewall 23 and, in the preferred embodiment, is horizontally elongated and is mounted in the lower portion thereof such that the curtain 31 will be deployed vertically upwardly. In other embodiments of the invention, the housing 25 may be mounted toward the top of the wall 23 or at the front or rear thereof but always with the curtain oriented such that, when deployed, it will cover the distinctive side contour of the vehicle.

With continued reference to FIGS. 2-4, the preferred embodiment includes a retraction reel 27 having a spring mechanism biasing the reel to its position with the curtain 31 fully retracted rolled up on the reel. It is contemplated that the curtain may project upwardly beyond the top or beyond either end of the vehicle, possibly to further shield the accident site.

When the curtain is to be deployed, the free extremity 37 of the curtain may be grasped to release the spring mechanism in the reel 27 to allow the operator to draw the curtain freely from the reel against relatively modest bias.

In the embodiment shown the post assemblies 33 and 35 are carried from journal rods 51 and 53, respectively which are, in turn, carried rotatably in respective journal tubes 55 and 57 extending transversely of the body of the vehicle 21. The respective journal tubes 55 and 57 are formed near their respective one ends with respective longitudinal, open-ended slots 61 and 63 spaced 90° apart such that the respective journal tubes can be rotated 90° and temporarily locked in position as shown in FIGS. 4 and 5, respectively. The post assemblies 33 and 35 include respective elongated posts 67 and 69 about 9 feet tall and so arranged as to be, with the posts 67 and 69, when rotated to their retracted horizontal position shown in FIG. 3, nested horizontally in overlapping relation within the housing 27. The respective journal tubes 51 and 53 have welded to the respective walls thereof diametrically projecting tongues 71 and 73 selectively received slidably in the respective open ended slot 61 and 63 to hold the respective posts 67 and 69 in either there retracted horizontal position shown in FIG. 3 or in there vertically projecting positions as shown in FIGS. 5, 6 and 7.

Referring to FIGS. 2, 6 and 7, mounted to the free ends of the respective posts 66 and 67 are respective hooks 75 and 77 configured to, when the respective posts are in their vertical positions, received in hooking relationship thereover, respective rings 79 and 81 carried from the opposite sides of the free extremity of the curtain 31.

In one preferred embodiment, the housing 25 is in the form of a rectangularly shaped, horizontally elongated box having a front door 83 hingedly connected thereto and including a pair of latches 85 and 87 which are releasable to allow the door 83 to assume its position shown in FIG. 3 opening the housing and exposing the reel 27 and post assemblies 33 and 35 for deployment.

It will be appreciated by those skilled in the art, the apparatus for the present invention may include retractable curtains mounted to both sides of the vehicle and to the front, back or both. In the embodiments shown in FIGS. 1-6, the retractable reel and curtain are sufficiently long the lengthwise of the vehicle so as to cover the side profile of the cab and the side profile of the camper housing but, in some instances, will only cover the side elevation of the rear of the vehicle. In some instances, the housing 33 will be mounted higher on the side of the vehicle. In the original equipment products, the housing containing the retracted curtain will be constructed recessed into the side of the vehicle itself. In any event, the functioning of the exemplary embodiment is described below.

In operation, it will be appreciated that a curtain housing (s) 25 will be carried in position for deployment at any time the vehicle is called to an emergency site. Upon arriving at the emergency site and the vehicle being positioned in place to attend to the emergency, the door(s) of one or both of the housings 25 may be opened for deployment of associated curtain 31, depending on whether one or both sides of the vehicle are exposed to bypassing traffic.

The emergency personnel can then quickly unlatch the respective latches 85 and 87 to open the door 83 and expose the curtain and post assemblies 35 and 37. The operator may then grasp the respective posts 67 and 69 to withdraw the respective journal rods 51 and 53 sufficiently far distal in the respective journal tubes 55 and 57 to disengage the respective tongues 71 and 73 from the open ends of the respective slots 61 freeing the journal rods 51 and 53 for rotation within the journal tubes 55 and 57. The free extremities of the respective posts 55 and 57 may be swung upwardly to the respective vertical positions shown in FIGS. 6 and 7. With the respective posts in their vertical positions the respective tongues 71 will be aligned with the open ends of the respective slots 63 so that the journal rods 51 and 53 may be slid inwardly in the respective journal tubes 55 and 57 to engage the respective tongues 71 and 73 with the slots 63 to thereby hold the rods 67 and 69 with the respective posts in their vertical positions. The free end 37 of the curtain may be grasped and the curtain withdrawn from the reel assembly 27 and the respective ring 79 and 81 hooked over the respective hooks 75 and 77 to hold the curtain in its vertical position covering the sidewall 23 and emergency lights 41 and 43. It will be appreciated that in some instances, the posts 67 and 69 will be formed with male and female portions telescoped into one another so the respective lengths thereof may be adjusted.

With the curtain 31 so deployed, the side of the vehicle 21 is obscured such that the attention of passers by will not be so readily attracted to the emergency site to thereby avoid or minimize driver distraction and the consequent erratic maneuvers of passing vehicles which may be dangerous to the emergency personnel.

As noted above, the reel housing 25 may be mounted to the top boarder of the vertical wall 23 as shown in FIGS. 8 and 9 so that when the apron 31 is deployed it will be drawn downwardly over the sides of the vehicle to have the rings 79 and 81 hooked over respective hooks 91 and 93 mounted to the bottom boarder of the sidewall 23. As with the apparatus of FIGS. 1-7, the housing 25 and curtains 31 are so positioned and configured that, when deployed, the curtain 31 will cover the emergency lights 41 and 43 and the distinctive contour of the sidewall 23.

In the embodiment depicted in FIGS. 8 and 9, the housing 83 is mounted to the side of the back camper of the vehicle at or above the level of the emergency lights so that when the curtain 31 is drawn downwardly the entire side of the vehicle will be covered. In this particular embodiment, the housing 83 projects forwardly over the cab of a vehicle to accommodate the curtain 31 of a length which will cover the entire side profile of the overall vehicle. While the housing 83 is depicted as being of a solid continuous construction for the exemplary embodiment, it will be understood by those skilled in the art that in some instances, the housing 25 will be hinged at the forward extremity of the truck camper so that the cantilevered overhang depicted in FIG. 8 can be, when not in use, folded back over the top of the rear section thereof for storage. In those configurations, the curtain will typically be in two sections, one section for covering the side profile of the vehicle cab and the rear section for covering the back camper panel.

It will also be appreciated by those skilled in the art a curtain, when mounted to the top of the vehicle may merely be weighted such that it will be self-anchoring when deployed into covering relationship over the vertical wall of the vehicle. Additionally, it will be apparent to those of skill in the art from the disclosure, that the curtain itself may be mounted from the retraction wheel as disclosed or may be accordion shaped and the extension/retraction mechanism in the form of sprockets coupled to the reel or free end of the curtain and pull chords or chains provided to pull the reel between its extended retracted position, or the reel may incorporate cranks to extend or retraction of the curtain may take any convenient form presently known or developed herein after.

Figure 12:
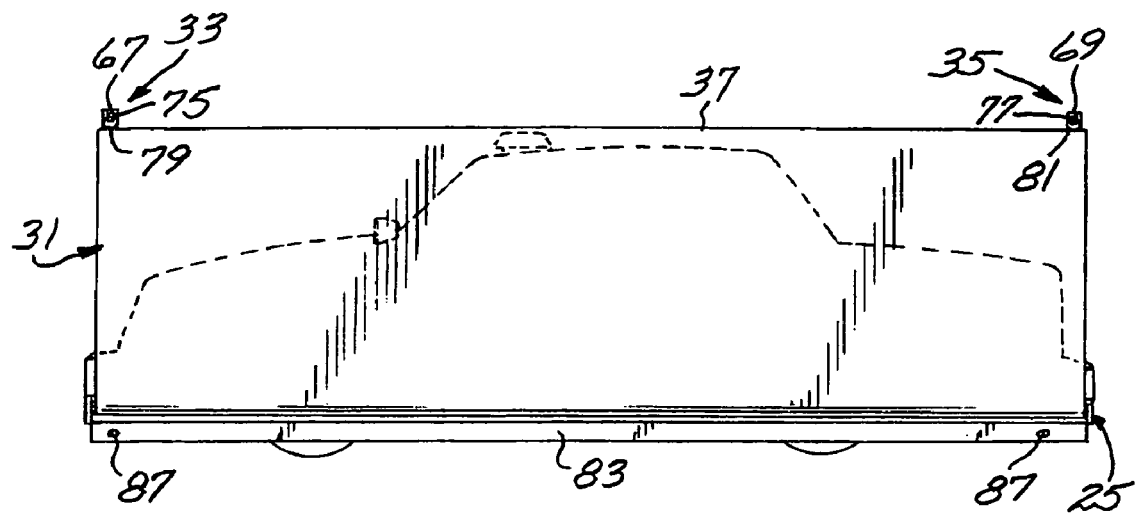
FIG. 12 is a side view similar to FIG. 11 but showing the blind device erected.

According to the third embodiment of the present invention shown in FIGS. 11 and 12, the subject housing 25 may be mounted below the level of the floor boards on a law enforcement sedan 91 having an emergency light on the roof, a front cab with a hood and a rear trunk. The posts assemblies 33 and 35 may be raised to position the free ends thereof at the respective front and rear extremities of the sedan itself so that the curtain 31 when deployed will block view of the entire vehicle, including the emergency lights and general contour of the hood and trunk.

From the foregoing, it will be appreciated that the present invention provides an inexpensive, durable and reliable means for temporarily obscuring the side of an emergency vehicle while the personnel are attending to an emergency site.

I claim:

1. Emergency vehicle blind apparatus comprising:
a vehicle having at least one distinctive vertical side wall to be, while attending to an emergency adjacent a traffic lane, positioned facing the traffic lane, the side wall having a central main area bordered by top, bottom, front and back border areas;
an elongated housing mounted along the bottom boarder area having side and end walls, configured with a curtain chamber, one side wall being formed with an opening facing upwardly toward the central main area;
a retractor reel mounted in the chamber;
a curtain on the reel and extendable through the opening to covering relationship covering at least the main central area and having a free extremity;
a retractor for rotating the reel to retract the curtain;
an anchor device disposable on the opposed boarder area for receiving the free end of the curtain when extended to hold it in covering relationship over the at least main central main area; and
the anchor device including at least one elongated post pivotally mounted on one extremity adjacent the bottom border area for pivoting of the post from a retracted horizontal position to and erect position, the post having a free extremity including a fastener for selectively attaching to the free extremity of the curtain.

2. The blind apparatus of claim 1 that wherein:
the post includes male and female sections, the female section including an open ended lock slot and the male section including a tongue selectively received in the slot to lock the female section in a selected position.

3. The blind apparatus of claim 1 wherein:
the anchor device includes a pair of the posts pivotally mounted on their respective one ends adjacent the bottom border area and pivotal to their respective vertically extended positions and having fasteners on the respective free extremities thereof for attachment to the respective opposite sides of the free extremity of the curtain.

4. The blind apparatus of claim 1 wherein:
the fastener includes a hook; and
the curtain includes a ring on the free extremity thereof reengagement over the hook.

5. The blind apparatus of claim 1 wherein:
the curtain is opaque.

6. The emergency blind vehicle of claim 1 wherein:
the curtain is opaque.

7. The emergency blind apparatus of claim 1 wherein:
the emergency vehicle is in the form of a sedan having a forward cab including a hood and a rearward trunk; and
the curtain is constructed to, when deployed in the covering relationship, cover the sides of the hood and trunk.

8. The emergency blind apparatus of claim 1 for use with an emergency vehicle including a truck panel defining the distinctive sidewall wherein:

the curtain is constructed to, when deployed to the covering relationship, cover the entire side of the truck panel.

9. The emergency blind apparatus of claim 1 for use with an emergency vehicle having emergency lights mounted in the upper portion thereof wherein;
the curtain is constructed to, when deployed to the covering relationship, cover the emergency lights.

10. The emergency blind apparatus of claim 1 wherein:
the curtain is of sufficient area to cover the vehicle from the front to the back.

11. Emergency blind apparatus for covering the distinctive vertical wall of an emergency vehicle and comprising;
a horizontally elongated housing for mounting to the bottom side of the distinctive wall;
a retraction reel mounted in the housing and biased to a retracted position;
a opaque curtain mounted on the retraction reel and, the reel being operable to release the curtain to be drawn upwardly into covering relationship over the vertical wall;
a pair of anchor post devices carried pivotally on their respective one extremities at the opposite ends of the housing and being pivotable from a respective horizontal retracted position disposed in the housing to respective vertical, extended positions having respective free extremities disposed above the horizontal plane of the top of the distinctive vertical wall; and
fastener devices for fastening the free extremity of the curtain to the free extremities of the respective posts devices.

12. Emergency blind apparatus for covering a distinctive sidewall of an emergency vehicle including a cab and having top, bottom and front and back border areas and comprising:
an opaque curtain carried from the bottom border area, retractable to a stored position and having a free extremity deployable to the top border area to dispose the curtain in covering relationship over the distinctive sidewall and cab; and
an anchor device for anchoring the free extremity of the curtain from the vehicle at the border area opposite the one border area in the covering relationship over the distinctive wall of the vehicle and cab.

13. The emergency blind apparatus of claim 1 for use with a vehicle having a trunk and wherein:
the curtain is of sufficient area to, when deployed, be disposed in covering relationship over the side of the trunk.

14. Emergency blind apparatus for covering a distinctive sidewall of an emergency vehicle and having top, bottom and front and back border areas, the top border area mounting emergency lights, the apparatus comprising:
an opaque curtain carried from the vehicle at one of the border areas, retractable to a stored position and having a free extremity deployable to the border area opposite the one border area to dispose the curtain in covering relationship over the distinctive sidewall and emergency lights; and
an anchor device for anchoring the free extremity of the curtain from the vehicle at the border area opposite the one border area in the covering relationship over the distinctive wall of the vehicle and emergency lights.

15. Emergency blind apparatus for covering a distinctive sidewall of an emergency vehicle mounting emergency lights in the upper portion thereof, the distinctive wall having top and bottom border areas, the apparatus comprising:
an opaque curtain carried from the upper border areas, retractable to a stored position and having a free extremity deployable to the bottom border to dispose the curtain in covering relationship over the distinctive sidewall, including the emergency lights.

16. Emergency blind apparatus for covering a distinctive sidewall of an emergency vehicle including a cab and having top, bottom and front and back border areas and emergency lights mounted in the upper portion thereof, the apparatus comprising:
an opaque curtain carried from the vehicle at one of the border areas, retractable to a stored position and having a free extremity deployable to the border area opposite the one border area to dispose the curtain in covering relationship over the cab and distinctive sidewall, including the emergency lights; and
an anchor device for anchoring the free extremity of the curtain from the vehicle at the border area opposite the one border area in the covering relationship over the distinctive wall of the vehicle emergency lights and cab.

* * * * *